United States Patent
Park

(10) Patent No.: US 7,011,079 B2
(45) Date of Patent: Mar. 14, 2006

(54) INTAKE APPARATUS FOR ENGINE OF VEHICLE

(75) Inventor: Dae Sung Park, Suwon (KR)

(73) Assignee: Hyundai Motor Company, Seoul (KR)

(*) Notice: Subject to any disclaimer, the term of this patent is extended or adjusted under 35 U.S.C. 154(b) by 0 days.

(21) Appl. No.: 11/009,983

(22) Filed: Dec. 10, 2004

(65) Prior Publication Data

US 2005/0139198 A1   Jun. 30, 2005

(30) Foreign Application Priority Data

Dec. 24, 2003   (KR) ...................... 10-2003-0096567

(51) Int. Cl.
*F02B 29/04* (2006.01)
*F02M 35/00* (2006.01)

(52) U.S. Cl. .................... 123/559.1; 123/563; 60/599; 60/568

(58) Field of Classification Search ............. 123/559.1, 123/563, 65 BA; 60/599, 568
See application file for complete search history.

(56) References Cited

U.S. PATENT DOCUMENTS

| | | | | |
|---|---|---|---|---|
| 1,625,597 A | * | 4/1927 | Fornaca ................... 123/559.1 |
| 2,489,540 A | * | 11/1949 | Priess | |
| 2,741,234 A | * | 4/1956 | Wiseman ................. 123/559.1 |
| 3,447,313 A | * | 6/1969 | Hellingman et al. .......... 60/599 |
| 4,204,848 A | * | 5/1980 | Schulmeister et al. ...... 123/563 |
| 5,673,747 A | * | 10/1997 | Kousaka et al. ............. 165/41 |
| 6,012,436 A | * | 1/2000 | Boutcher ................. 123/559.1 |
| 6,021,764 A | * | 2/2000 | Koyama ..................... 123/563 |
| 6,029,637 A | * | 2/2000 | Prior ....................... 123/559.1 |
| 6,079,394 A | * | 6/2000 | Abthoff et al. ........... 123/559.1 |
| 6,138,648 A | * | 10/2000 | Zentgraf ..................... 123/563 |
| 6,453,890 B1 | * | 9/2002 | Kageyama et al. ...... 123/559.1 |
| 6,619,275 B1 | * | 9/2003 | Wiik ....................... 123/559.1 |
| 6,837,195 B1 | * | 1/2005 | Suwazono ............... 123/559.1 |
| 6,923,166 B1 | * | 8/2005 | Barnes et al. ............ 123/559.1 |

FOREIGN PATENT DOCUMENTS

| | | | |
|---|---|---|---|
| DE | 3921566 A1 | * | 1/1991 |
| DE | 19954690 A1 | * | 5/2001 |
| DE | 10001063 A1 | * | 7/2001 |
| JP | 2003-097278 | | 3/2003 |

* cited by examiner

*Primary Examiner*—Thai-Ba Trieu
(74) *Attorney, Agent, or Firm*—Morgan Lewis & Bockius LLP

(57) ABSTRACT

An intake apparatus of an engine according to the present invention comprises; an air cleaner unit for filtering intake air defining an air passageway therein and filtering intake air; and a turbocharger-intercooler unit mounted at a lower portion of the air cleaner unit and compressing and cooling air supplied to the engine. An outlet air passageway of the supercharger-intercooler unit is configured to contact an air passageway of the air cleaner unit.

13 Claims, 4 Drawing Sheets

INTAKE APPARATUS FOR ENGINE OF VEHICLE

CROSS REFERENCE TO RELATED APPLICATIONS

This application claims priority of Korean Application No. 10-2003-0096567, filed on Dec. 24, 2003, the disclosure of which is incorporated herein by reference.

TECHNICAL FIELD OF THE INVENTION

The present invention relates to an air intake apparatus of a vehicle, and more particularly, to an air intake apparatus for an air cleaner unit and a supercharger unit.

BACKGROUND OF THE INVENTION

Generally, a vehicle provided with a supercharger is also provided with an intercooler for decreasing a temperature of air compressed by the supercharger.

The intercooler cools compressed air passing therethrough by using cooling water or air. Therefore, in order to cool the cooling water or air that is supplied to the intercooler and absorbs heat of the compressed air, a sub-cooling system is installed in an engine compartment. When the sub-cooling system is installed in the engine compartment, the structure of the engine becomes complicated.

The information disclosed in this Background of the Invention section is only for enhancement of understanding of the background of the invention and should not be taken as an acknowledgement or any form of suggestion that this information forms the prior art that is already known to a person skilled in the art.

SUMMARY OF THE INVENTION

An embodiment of the present invention provides an intake apparatus of an engine in which an air cleaner unit for filtering intake air and a supercharger-intercooler unit for compressing and cooling the intake air are integrated such that the intake apparatus does not need an additional sub-cooling system.

In a preferred embodiment of the present invention, the intake apparatus of an engine comprises: an air cleaner unit forming an air passageway therein and filtering intake air; and a supercharger-intercooler unit mounted at a lower portion of the air cleaner unit and pressurizing and cooling air supplied to the engine. An outlet air passageway of the supercharger-intercooler unit is configured to contact an air passageway of the air cleaner unit.

It is preferable that the air cleaner unit is provided with a plurality of inlets.

It is also preferable that the supercharger-intercooler unit comprises a housing, an inlet of which is connected to the air cleaner unit, and an outlet of which is coupled to a cylinder head. A pair of rotors are installed within the housing and compressing the intake air; and an intercooler cooling the air compressed by the pair of rotors.

Preferably, an outlet air passageway of the intercooler is configured to contact an air passageway of the air cleaner unit.

It is preferable that the intake apparatus further comprises a throttle body that is mounted to an inlet of the supercharger-intercooler unit and controls an amount of the intake air supplied to the supercharger-intercooler unit.

It is also preferable that the air cleaner unit and the supercharger-intercooler unit are connected to each other through a tube member.

It is further preferable that the tube member is made of a rubber material.

Preferably, the tube member is made of a plastic material.

It is preferable that the turbocharger-intercooler unit further comprises a pulley that is fixedly connected to one of the pair of rotors, and wherein the pulley is driven by the engine.

It is preferable that an outlet of the supercharger-intercooler unit is connected to a cylinder head.

It is further preferable that the outlet of the supercharger-intercooler unit is formed as at least one.

Preferably, at least one gasket is disposed between the air cleaner and the supercharger-intercooler unit.

BRIEF DESCRIPTION OF THE DRAWINGS

The accompanying drawings, which are incorporated in and constitute a part of the specification, illustrate an embodiment of the invention, and, together with the description, serve to explain the principles of the invention, where.

DETAILED DESCRIPTION OF THE PREFERRED EMBODIMENTS

Hereinafter, a preferred embodiment of the present invention will be described in detail with reference to the accompanying drawings.

Figure 1:
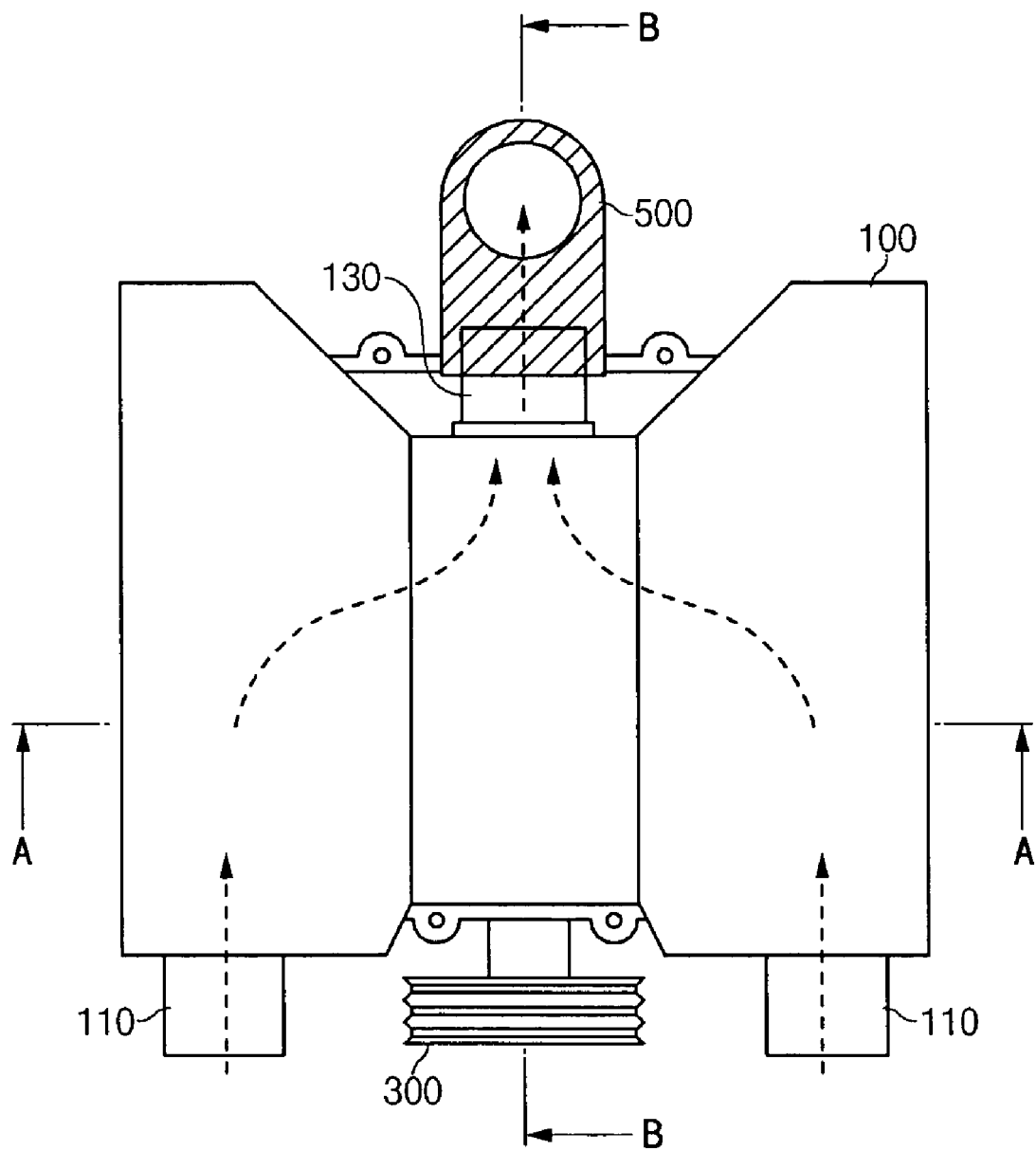
FIG. 1 is a top view of an intake apparatus of an engine of a vehicle according to an embodiment of the present invention.
Figure 2:
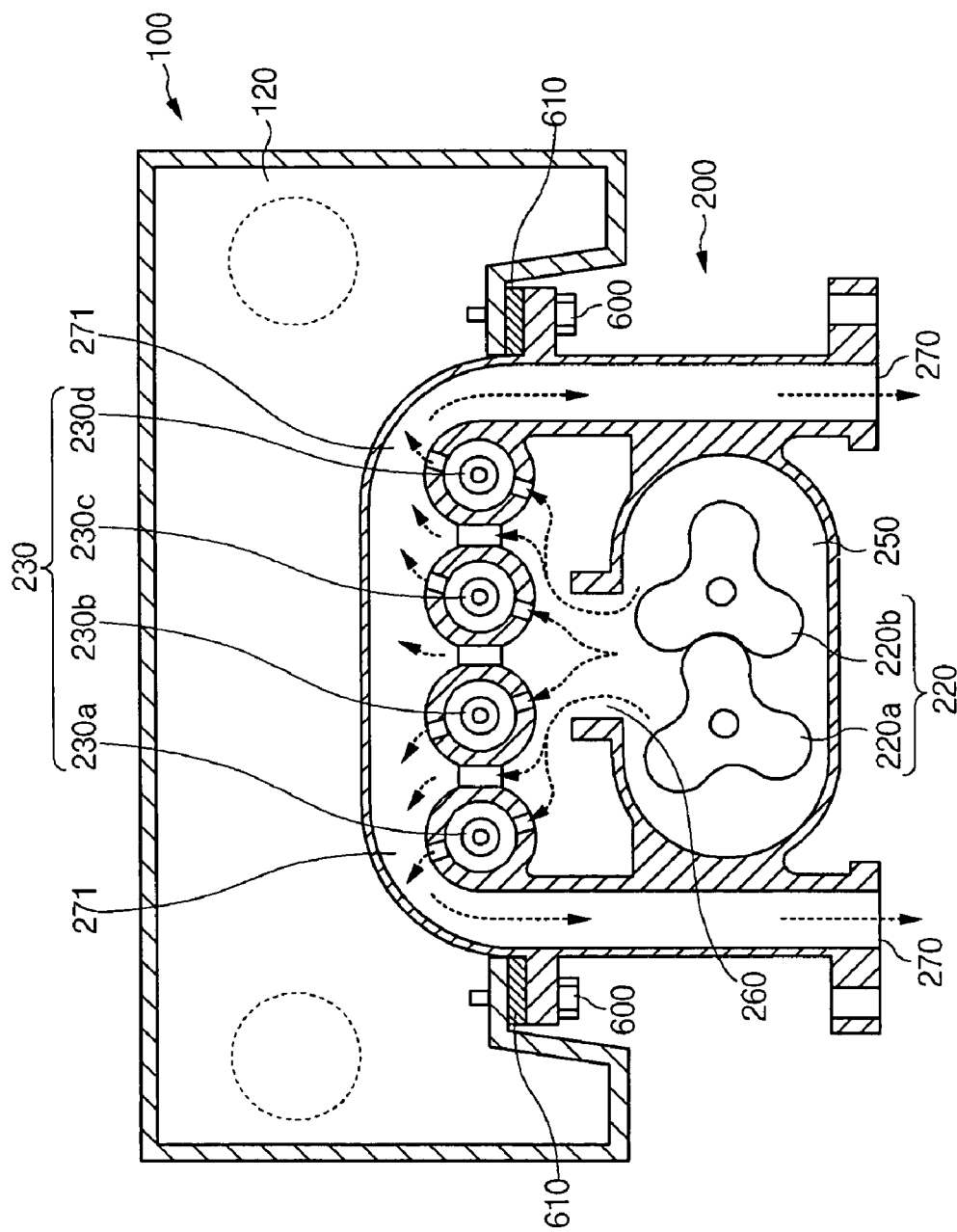
FIG. 2 is a sectional view taken along a line A—A in FIG. 1.
Figure 3:
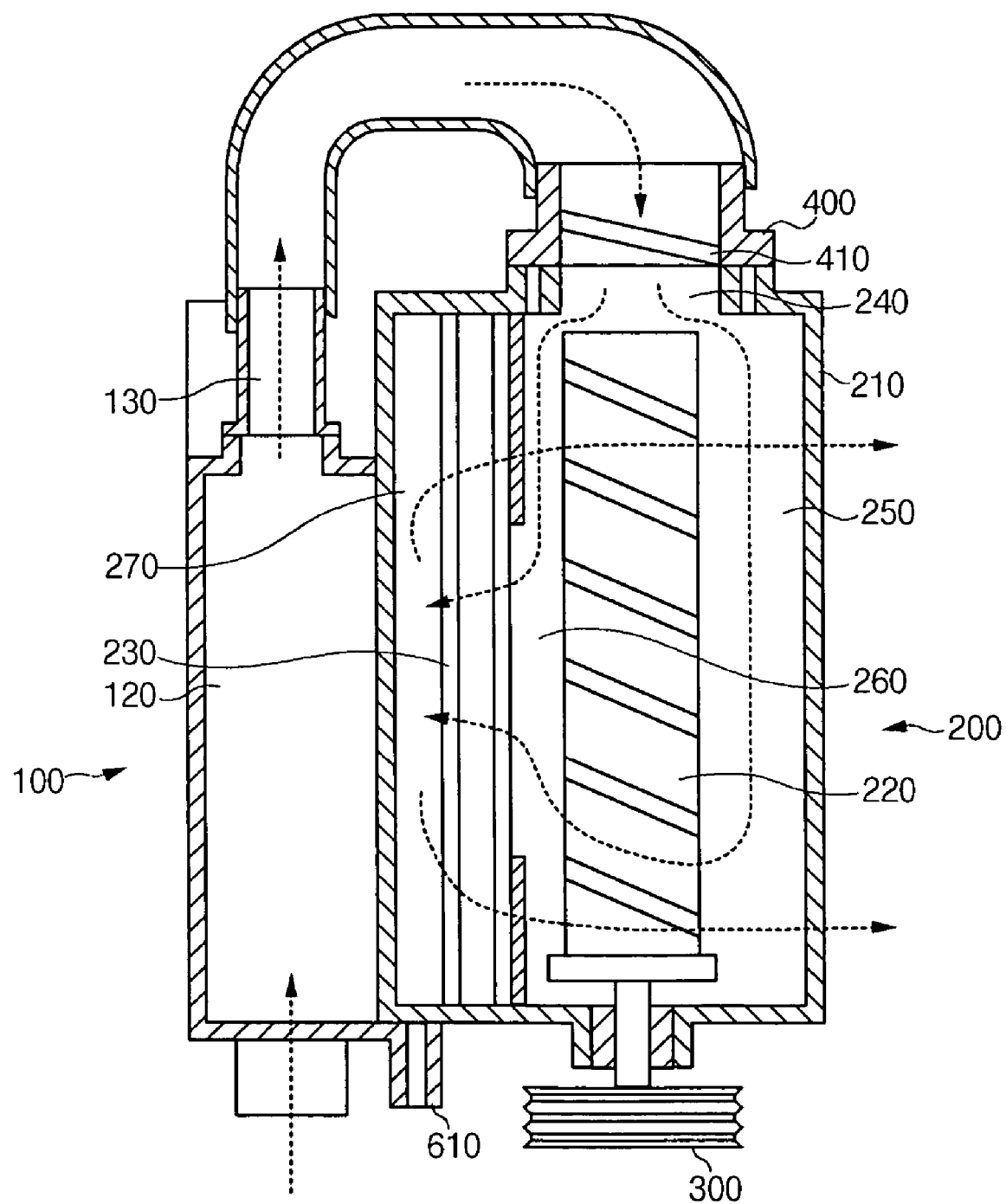
FIG. 3 is a sectional view taken along a line B—B in FIG. 1.

As shown in FIGS. 1 to 3, the intake apparatus of an engine of a vehicle according to an embodiment of the present invention comprises an air cleaner unit 100, and a supercharger-intercooler unit 200 that is installed at a lower portion of the air cleaner unit 100. At least one first inlet 110 and a first outlet 130 are respectively formed on opposite ends of the air cleaner unit 100. A first air passageway 120 is formed between the first inlet 110 and the first outlet 130.

An air filter (not shown) is installed in the first air passageway 120, so that foreign substances such as dust contained in intake air are prevented from entering an engine.

The supercharger-intercooler unit 200 is coupled to a lower portion of the air cleaner unit 100, for example through at least one bolt 600. At least one gasket 610 is disposed between the air cleaner unit 100 and the supercharger-intercooler unit 200 for sealing therebetween.

The supercharger-intercooler unit 200 comprises a housing 210, a pair of rotors 220, and an intercooler 230. The rotors 220 and the intercooler 230 are disposed within the housing 210. A second inlet 240 is formed at one end of the housing 210, and at least a second outlet 270 is formed at a lower portion of the housing 210.

Figure 4:
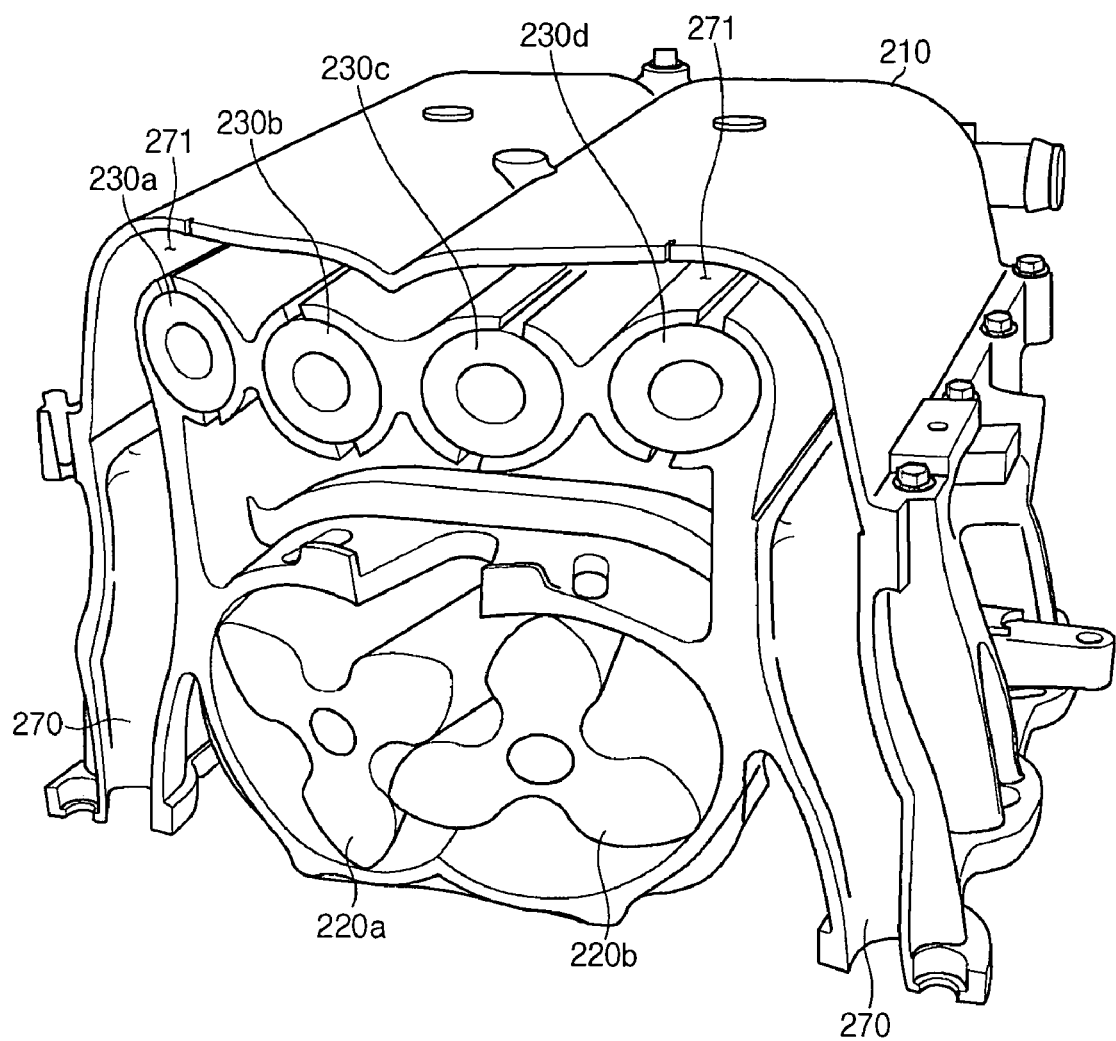
FIG. 4 is a perspective view showing an inner structure of a supercharger-intercooler unit of the intake apparatus according to an embodiment of the present invention.

The second inlet 240 communicates with the first outlet 130 of the air cleaner unit 100. The second outlets 270 are mounted to a cylinder head of a V-type engine thereby connecting with combustion chambers. As shown in FIG. 4, the second outlets 270 communicate with a plurality of second air passageways 271 and are preferably disposed on both sides of the housing 210, so the second outlets 270 act as intake runners of a conventional intake manifold, i.e., intake air is supplied to combustion chambers through the second outlets 270.

A throttle body 400 is mounted to the second inlet 240, and a throttle valve 410 is installed within the throttle body 400. The opening angle of the throttle valve 410 is controlled by a throttle motor (not shown), so that an amount of air supplied to the supercharger-intercooler unit 200 is regulated.

The second inlet 240 of the supercharger-intercooler unit 200 is connected to the first outlet 130 of the air cleaner unit 100 through a tube member 500. The tube member 500 can be made of materials such as rubber, plastic and aluminum.

A compressing chamber 250, where intake air is compressed, is defined within the housing 210. A pair of rotors 220 (220a and 220b) that operate in an engaged state are installed within the pressurizing chamber 250, and the rotors 220 compress the intake air.

A pulley 300 is mounted at an end opposite to the end where the second inlet 240 is formed, and the pulley 300 is connected to an output shaft (not shown) of the engine through a power transmission device such as a belt and is driven by power transmitted through the power transmission device. One of a pair of rotors 220 are fixed to a shaft of the pulley 300 and rotates by a rotation of the pulley 300, thereby compressing the intake air.

An opening portion 260 is formed at an upper portion of the compressing chamber 250, and the air pcompressed by the rotors 220 is supplied to the intercoolers 230a, 230b, 230c, and 230d through the opening portion 260.

The intercooler 230 cools the air compressed in the compressing chamber 250 by heat exchange, and the compressed air passing through the intercooler 230 is supplied to the combustion chamber of the engine along the plurality of second outlets 270 via the second air passageway.

The second air passageway 271, formed along an upper surface of the housing, contacts the first air passageway 120 of the air cleaner unit 100 so that the compressed air flowing to the second air passageway 271 is further cooled by heat exchange with the air in the first air passageway 120.

Embodiments of the present invention thus provide a number of advantages. For example, as a result of simplified and smaller package, cost and engine layout size are reduced. In another example, as best seen in FIG. 2, the super charge air outlet/intercooler flow path shares a common wall with the air cleaner unit. Thus, air flowing through the air cleaner unit provides further cooling to the supercharger compressed air charge for greater efficiency.

In an intake apparatus according to an embodiment of the present invention, the air cleaner unit for filtering intake air and the supercharger-intercooler unit for compressing and cooling the intake air are integrated, and the compressed air is cooled through heat exchange between the intake air and the compressed air, so that the intake apparatus does not need an additional sub-cooling system and thereby a structure of an engine compartment becomes very simple.

Although preferred embodiments of the present invention have been described in detail hereinabove, it should be clearly understood that many variations and/or modifications of the basic inventive concepts herein taught which may appear to those skilled in the present art will still fall within the spirit and scope of the present invention, as defined in the appended claims.

What is claimed is:

1. An intake apparatus of an engine, comprising:
    an air cleaner unit for filtering intake air including an air passageway therein; and
    a supercharger-intercooler unit mounted at a lower portion of the air cleaner unit for compressing and cooling air supplied to the engine,
    wherein at least one outlet air passageway of the supercharger-intercooler unit is configured to contact an air passageway of the air cleaner unit.

2. The intake apparatus of claim 1, wherein the air cleaner unit is provided with a plurality of inlets.

3. The intake apparatus of claim 1, wherein the supercharger-intercooler unit including
    a housing with an inlet connected to the air cleaner unit and an outlet is coupled to a cylinder head;
    a pair of rotors installed within the housing to compress intake air; and
    an intercooler cooling the air compressed by the pair of rotors.

4. The intake apparatus of claim 3, wherein an outlet air passageway of the supercharger-intercooler unit is configured to contact at least one air passageway of the air cleaner unit.

5. The intake apparatus of claim 3, further comprising a throttle body that is mounted to an inlet of the supercharger-intercooler unit, and that controls an amount of intake air supplied to the supercharger-intercooler unit.

6. The intake apparatus of claim 3, wherein the air cleaner unit and the supercharger-intercooler unit are connected to each other through a tube member.

7. The intake apparatus of claim 6, wherein the tube member is made of a rubber material.

8. The intake apparatus of claim 6, wherein the tube member is made of a plastic material.

9. The intake apparatus of claim 3, wherein the turbocharger-intercooler unit further comprises a pulley that is fixedly connected to one of the pair of rotors, and wherein the pulley is driven by the engine.

10. The intake apparatus of claim 1, wherein at least one outlet of the supercharger-intercooler unit is connected to a cylinder head.

11. The intake apparatus of claim 10, wherein the outlet of the supercharger-intercooler unit is formed as at least one.

12. The intake apparatus of claim 1, wherein at least one gasket is disposed between the air cleaner unit and the supercharger-intercooler unit.

13. An air intake apparatus for an engine, comprising:
    a supercharger with a compressed air outlet;
    an intercooler mounted over the supercharger and receiving compressed air from said outlet said compressed air outlet; and
    an air cleaner unit mounted over said intercooler wherein said air cleaner unit and intercooler share a common wall for heat transfer therethrough providing cooling to air entering the intercooler.

* * * * *